United States Patent
Gunda et al.

(10) Patent No.: US 11,593,230 B2
(45) Date of Patent: Feb. 28, 2023

(54) EFFICIENT MECHANISM FOR DATA PROTECTION AGAINST CLOUD REGION FAILURE OR SITE DISASTERS AND RECOVERY TIME OBJECTIVE (RTO) IMPROVEMENT FOR BACKUP APPLICATIONS

(71) Applicant: EMC IP Holding Company LLC, Hopkinton, MA (US)

(72) Inventors: Kalyan C Gunda, Bangalore (IN); Jagannathdas Rath, Karnataka (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/213,480

(22) Filed: Mar. 26, 2021

(65) Prior Publication Data

US 2022/0308965 A1 Sep. 29, 2022

(51) Int. Cl.
*G06F 11/14* (2006.01)
*H04L 67/1095* (2022.01)
*G06F 9/54* (2006.01)

(52) U.S. Cl.
CPC ...... *G06F 11/1469* (2013.01); *G06F 11/1464* (2013.01); *H04L 67/1095* (2013.01); *G06F 9/541* (2013.01); *G06F 2201/82* (2013.01)

(58) Field of Classification Search
CPC .. G06F 11/1469; G06F 11/1464; G06F 9/541; G06F 2201/82; H04L 67/1095
USPC .......................................................... 714/19
See application file for complete search history.

(56) References Cited

U.S. PATENT DOCUMENTS

| | | | |
|---|---|---|---|
| 2016/0048408 A1* | 2/2016 | Madhu | H04L 47/783 718/1 |
| 2016/0070741 A1* | 3/2016 | Lin | G06F 16/183 707/638 |
| 2020/0285612 A1* | 9/2020 | George | G06F 16/128 |

OTHER PUBLICATIONS

Wikipedia "Disaster recovery" page from date Mar. 13, 2021, retrieved from https://web.archive.org/web/20210313110618/https://en.wikipedia.org/wiki/Disaster_recovery (Year: 2021).*

* cited by examiner

*Primary Examiner* — Yair Leibovich
(74) *Attorney, Agent, or Firm* — Womble Bond Dickinson (US) LLP

(57) ABSTRACT

A method, apparatus, and system for determining a consistency marker object representing the latest consistent recovery point for a disaster recovery (DR) process is disclosed. A request to move data from a local storage to a cloud storage for the DR process at a target point in time is received. Then, a replication completion status of a replication process indicating whether the replication is complete or not is determined. Next, the replication completion status indicating the replication process is complete is detected. Thereafter, in response to detecting the replication completion status, the consistency marker object having the latest consistent point is written in a preconfigured directory in a bucket to determine the consistent recovery point for a future DR process without having to perform lengthy validations for the data and meta.

20 Claims, 7 Drawing Sheets

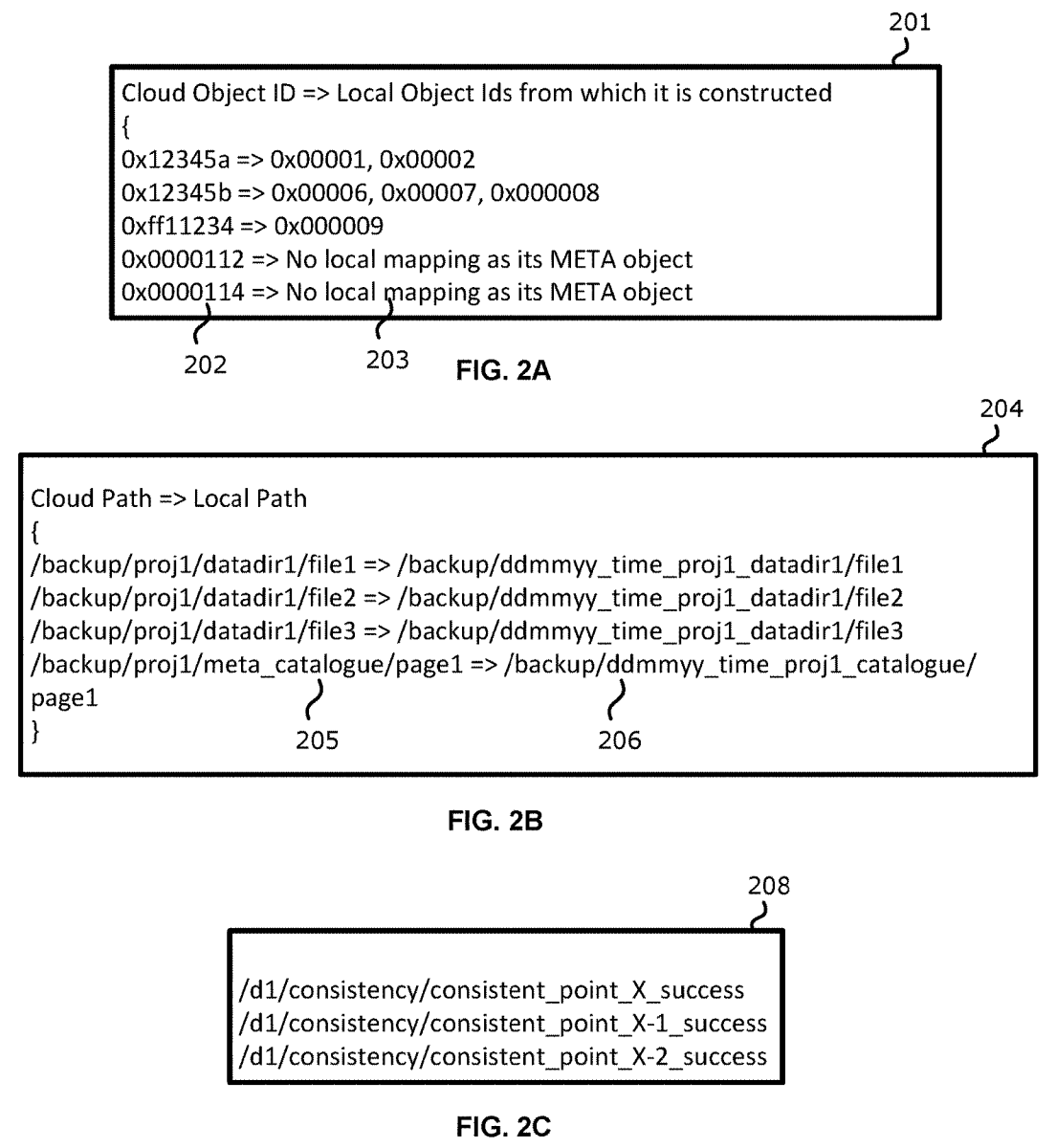

```
Cloud Object ID => Local Object Ids from which it is constructed
{
0x12345a => 0x00001, 0x00002
0x12345b => 0x00006, 0x00007, 0x000008
0xff11234 => 0x000009
0x0000112 => No local mapping as its META object
0x0000114 => No local mapping as its META object
}
```

FIG. 2A

```
Cloud Path => Local Path
{
/backup/proj1/datadir1/file1 => /backup/ddmmyy_time_proj1_datadir1/file1
/backup/proj1/datadir1/file2 => /backup/ddmmyy_time_proj1_datadir1/file2
/backup/proj1/datadir1/file3 => /backup/ddmmyy_time_proj1_datadir1/file3
/backup/proj1/meta_catalogue/page1 => /backup/ddmmyy_time_proj1_catalogue/page1
}
```

FIG. 2B

```
/d1/consistency/consistent_point_X_success
/d1/consistency/consistent_point_X-1_success
/d1/consistency/consistent_point_X-2_success
```

FIG. 2C

EFFICIENT MECHANISM FOR DATA PROTECTION AGAINST CLOUD REGION FAILURE OR SITE DISASTERS AND RECOVERY TIME OBJECTIVE (RTO) IMPROVEMENT FOR BACKUP APPLICATIONS

FIELD OF THE INVENTION

Embodiments of the present invention relate generally to backup applications. More particularly, embodiments of the invention relate to mechanism for data protection against cloud region failure or site disasters to enhance Recovery Time Objective (RTO) in a backup environment.

BACKGROUND

As cloud technology is becoming more accessible, cloud storage ("cloud tier") has become a common practice for direct backup applications, deduplication and non-deduplication, to store data off-premise for long term retention purposes. Cloud tier is typically associated with long-term storage of data that is stored for archival purposes and infrequently accessed. These direct backup applications can have various policies governing when and which files or objects to move to the cloud tier for long term retention purposes. For example, these policies may indicate direct backup applications to move all files older than two weeks to the cloud tier. Such policies may result in moving the affected files, direct objects, or deduped cloud objects to the cloud tier.

In protecting against disasters such as fires, floods, and earthquakes, the cloud tier may be configured to replicate the objects to different geographical regions or sites. When data are moved to the cloud tier, the backup applications often rely on the various available characteristics provided by the cloud providers such as a protection against server failures, etc.

However, in the public and private cloud providers, the replication of data from one site to another or one region to another is entirely controlled by the cloud providers. Additionally, such replication of data is completely asynchronous in nature and no specific order may be followed while replicating the objects. The backup applications writing data to cloud tier may not have control over this replication aspect. Further, in most cases, the application is completely unaware of where the data is being replicated to. Therefore, the application has no control on cloud provider replication in almost all customer use cases. The cloud provider has the entire control over how the data are replicated to another region or site. If the replication destination (e.g., bucket or region) is unavailable while objects are being replicated, the replication state of the objects remains pending until the replication destination is available or if even the replication for one or more objects can fail due to any reason.

BRIEF DESCRIPTION OF THE DRAWINGS

Embodiments of the invention are illustrated by way of example and not limitation in the figures of the accompanying drawings in which like references indicate similar elements.

FIGS. 2A-2B are illustrations depicting an example of a translational map representing translational map in FIG. 1 according to one embodiment.

FIG. 2C are illustrations depicting an example of a directory storing a consistency marker object according to one embodiment.

DETAILED DESCRIPTION

Figure 1:
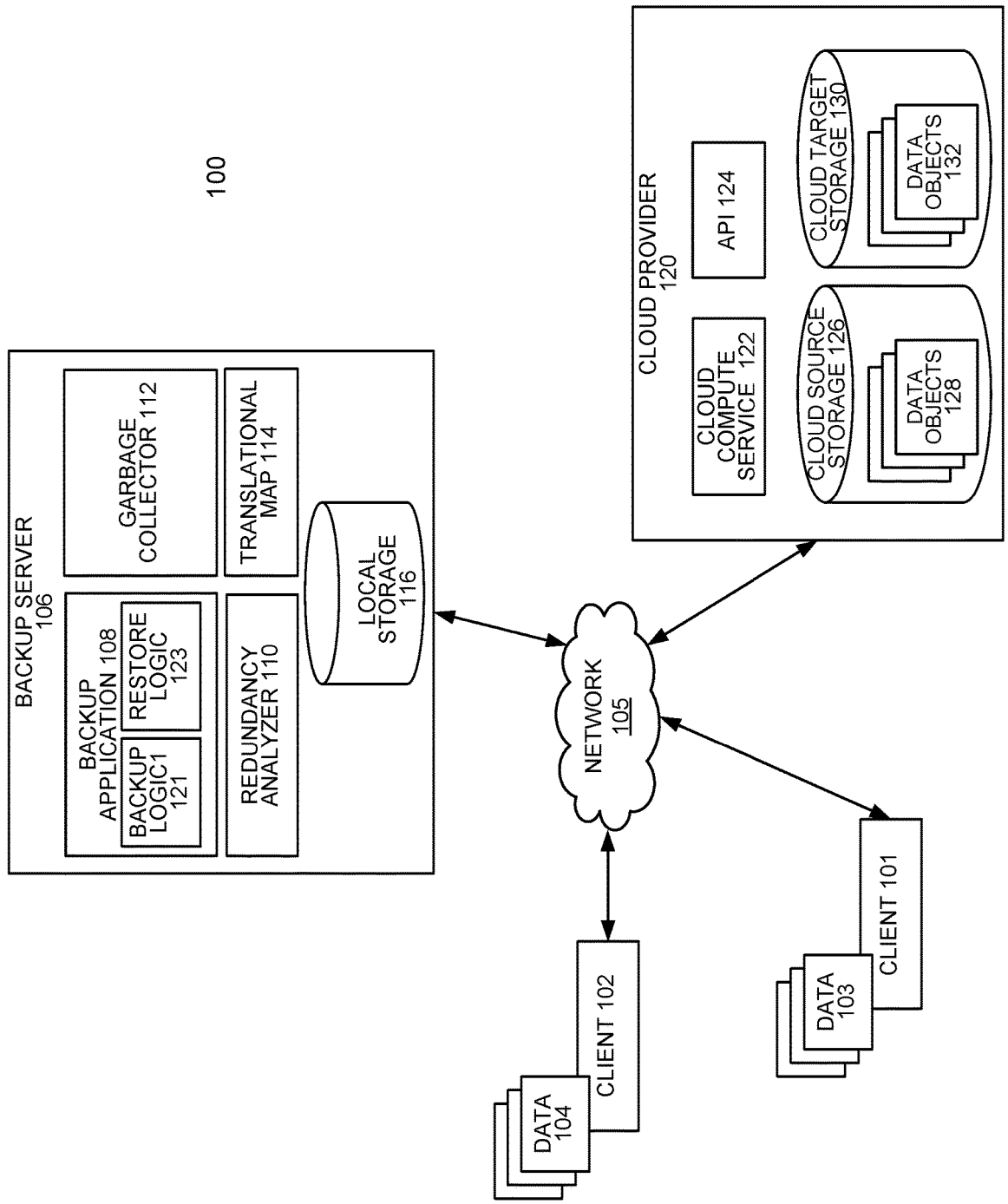
FIG. 1 is a block diagram illustrating an example environment in which embodiments of the disclosure may be practiced.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Embodiments of the disclosure relate to a method, apparatus, and system for determining a consistency marker object for a disaster recovery (DR) process in a cloud-based storage system. According to some embodiments, a redundancy analyzer determines a consistency marker object representing the latest consistent recovery point for a DR process. The redundancy analyzer receives a request to move data from a local storage to a cloud storage for the DR process at a target point in time. In one embodiment, the redundancy analyzer determines a replication completion status of a replication process indicating whether the replication is complete or not. In a particular embodiment, the redundancy analyzer detects the replication completion status indicating the replication process is complete. Thereafter, in response to detecting the replication completion status, the redundancy analyzer writes the consistency marker object having the latest consistent point in a preconfigured directory in a bucket to determine the consistent recovery point for a future DR process. This method can be applied to any kind of primary or backup applications (dedupe as well as non-dedupe), which move data to the cloud tier and also perform cloud replication to a different region or site for disaster recovery.

In one embodiment, the DR process is performed immediately from the latest consistent point by selecting the consistency marker object as the consistent recovery point.

In some other embodiments, the redundancy analyzer determines whether a data movement process is complete and local objects including data and metadata are written to the cloud bucket. The redundancy analyzer stores the local objects written in the cloud storage as cloud data objects in a translational map mapping the cloud data objects and corresponding local objects.

In a particular embodiment, the determining of the replication completion status includes performing a query for the replication completion status of each of the cloud data objects in the translational map. The determining the status of a replication additionally, includes pausing the query for the replication completion status for a predetermined amount of time if the replication completion status of one or more each objects indicate that the replication process is not yet complete. Further, the determining the status of a replication includes removing each of the cloud data objects from the translational map if the replication status of each of the cloud data objects indicates the replication process is complete.

In one embodiment, the query for the replication completion status is stopped when the replication status of all cloud data objects is complete or the replication status of one or more of the cloud data objects indicates that replication process associated with the cloud data objects has failed. The query for the replication completion status may be performed using an object reporting Application Programming Interface (API) of the cloud provider. The replication completion status may be available via a GET object header or a HEAD request for the cloud data objects. The query can also be performed using a lambda function in the cloud provider.

In some embodiments, the backup server 106 triggers the cloud provider 120 to perform the replication process for the cloud data objects if the replication process has failed earlier. The performing of the replication process for the cloud data objects includes rewriting the cloud data objects associated with the failed replication process in a same path of the cloud storage to retrigger the replication process. In another embodiment, replication failure events of the cloud provider can be utilized to automatically read and rewrite the cloud data objects if such objects are generated. In another further embodiment, a lambda or a cloud function may be utilized to automatically read and rewrite the cloud data objects if such objects are generated.

This present disclosure provides an efficient mechanism to solve the above DR issues by ensuring that the backup application can instantly detect the presence or absence of a valid and consistent restore point in the cloud replication destination. Additionally, this mechanism enhances the data movement process of the backup applications to record and validate the replication status of the objects and insert consistency marker objects once all the objects are replicated successfully. These consistency marker objects are then utilized by the backup application during a disaster recovery to determine the latest available consistent point from which recovery can be performed. The mechanism also provides a solution model in which the time taken for the disaster recovery process from a replicated data set can be reduced as the mechanism removes the need for the lengthy process to scan all meta and data and find a valid consistent point from which DR can be done immediately.

The mechanism additionally provides the ability to use any of the available methods (such as loop querying the object for their REPL state or checking remaining total Read—Eval-Print Loop (REPL) bytes, either directly or via lambda functions, etc.) to detect the replication completion status. The mechanism then writes a consistency marker object only after verifying that replication is complete for all the objects. Further, this mechanism provides the ability to the backup application to start the DR process by only validating the presence of such a consistency marker. The DR process can then be initiated from that latest consistent point immediately or to report that no DR process can be performed when no consistency markers are present. In other words, the decisions for the DR process can be taken instantly.

Finding a consistent point to recover from during DR process can be a lengthy effort for any backup application because recovery can only be done from a completed set of replicated data and not from incomplete or ongoing sets. The mechanism described in this disclosure removes the need for this lengthy process. For example, in AWS provided asynchronous replication, the existence of a DD or FS consistent point may not guarantee all parts of consistent points are replicated and therefore this requires a full lengthy scan. This method provides a quick or instant DR process by avoiding this lengthy scan. Normally, the primary replicating to secondary checks if the secondary has data. For example, DD is writing to AWS region1 and AWS is replicating to region 2. With the above described mechanism, AWS primary is checked instead of the secondary region.

In another aspect of the disclosure, embodiments of the present disclosure also provide a non-transitory machine-readable medium and a data processing system perform the processes as described above.

Referring to FIG. 1, a block diagram illustrating an example networked environment 100 in which embodiments of the disclosure may be practiced is shown. The networked environment 100 may include, but is not limited to, a plurality of clients 101-102, a backup server 106, a network 105, and a cloud provider 120. The plurality of clients 101-102 having data 103 and 104 stored therein, respectively, may be any type of client such as a host or server, a personal computer (e.g., desktops, laptops, and tablets), a "thin" client, a personal digital assistant (PDA), a Web enabled appliance, or a mobile phone (e.g., Smartphone), etc. Alternatively, any of the plurality of clients 101-102 may be a primary storage system (e.g., local data center) that provides storage to other local clients, which may periodically back up the content stored therein to a backup storage system (e.g., a disaster recovery site or system), such as a local storage 116. Network 105 may be any type of networks such as a local area network (LAN), a wide area network (WAN) such as the Internet, a fiber network, a storage network, or a combination thereof, wired or wireless. The plurality of clients 101-102 may be in physical proximity or may be physically remote from one another. The local storage 116 may be located in proximity to one, both, or neither of clients 101-102. Therefore, the client 101-102 may be a backup client of the backup server 106.

The backup server 106 may include backup application 108, redundancy analyzer 110, garbage collector 112, translational map 114, and local storage 116. The backup server 106 may back up data stored on the local storage 116. For example, backup application 108 may include backup logic 121 and restore logic 123. Backup logic 121 is configured to receive and back up data from a client (e.g., clients 101-102) and to store the backup data in the local storage 116. Restore logic 123 is configured to retrieve and restore backup data from the local storage 116 back to a client (e.g., clients 101-102). The backup server 106 may initiate backup operations in response to requests from the client 101-102. The backup application 108 can also be an independent system outside of the backup server 106 and can coordinate a backup operation between clients 101 and 102 and the backup server 106. In one embodiment, a client 102, for example, may transmit a request for a backup process for data 104 (e.g., a set of files) to the backup application 108. After receiving the request from the client 102, the backup application 108 may initiate a backup operation of data 104 and the data 104 is copied to the local storage 116 from the client 102. The backup server 106, may then initiate data movement of the data stored in the local storage 116 to the cloud source storage 126 based on various defined data movement policies.

The local storage 116 may be implemented locally (e.g., single node operating environment) or remotely (e.g., multi-node operating environment) via interconnect (not shown), which may be a bus and/or a network (e.g., a storage network or a network similar to network 105). The local storage 116 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. The local storage 116 may be located locally or be remotely accessible over a network. According to one embodiment, the garbage collector 112 may be configured to perform garbage collection (GC) process 500 (will be discussed below in details).

The cloud provider 120 may include cloud compute service 122, API 124, cloud source storage 126 storing data objects 128, and cloud target storage 130 storing data objects 132. The cloud source storage 126 may represent a primary cloud storage region and the target storage may represent a secondary cloud storage region. Data objects 132 stored in the cloud target storage 130 may represent replicated data of the data objects 128 stored in the cloud source storage 126. Backup application initially writes data to the cloud source storage 126. The cloud provider may replicate the data objects 128 stored in the cloud source storage 126 to the target storage 130. In one embodiment, for example, the cloud provider 120 can be deployed in a cloud environment as a server of a cloud service provider. The cloud provider 120 provides cloud services over a network that is open for public use, such as the Internet. The cloud provider 120 may be a public cloud service provider such as Amazon Web Services® (AWS), Microsoft Azure®), IBM Cloud, or Google Cloud Platform. In another embodiment, the cloud provider 120 may be a private cloud that is located at a client's premises. In some embodiments, various operations of the cloud source storage 126 and the cloud target storage 130 on the cloud provider 120 may be managed by a cloud compute service 122. The cloud source storage 126 and the cloud target storage 130 may be hosted on one or more data centers including any number of storage devices as will be appreciated by one ordinarily skilled in the art. The cloud source storage 126 and the cloud target storage 130 may be geographically spread out over several physical locations. The cloud provider 120 may include or represent any type of servers or a cluster of one or more servers (e.g., cloud servers). For example, cloud provider 120 may be a storage server used for various different purposes, such as to provide multiple users or client systems with access to shared data and/or to back up (or restore) data (e.g., mission critical data). The cloud provider 120 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fiber channel (FC) protocol, etc. The cloud provider 120 may further provide storage services via an object-based protocol like S3, Hadoop distributed file system (HDFS) protocol, or the likes.

In one embodiment, cloud compute service 122 (also referred to as service logic, service module, or service unit), may be implemented in software, hardware, or a combination thereof. Cloud compute service 122 may also represent any storage service related components configured or adapted to provide storage services (e.g., storage as a service) to a variety of clients using any of the access protocols set forth above.

The cloud compute service 122 of the cloud provider 120 may receive the request for data movement process from the backup server 106. During the backup operations, the backup application 108 may retrieve data that is to be backed up from the local storage 116 and may transfer the data to the cloud source storage 126 in the cloud provider 120 for backup storage on the cloud.

It should be appreciated that the client 101-102, the backup server 106, and the cloud provider 120 may have access to the network 105 (e.g., a public network), through which they may communicate with each other. Therefore, under the coordination of the backup server 106, the data from the client 101-102 may be backed up by the backup application 108 in the local storage 116. Then, according to a predefine policy, the backup server 106 may move the data from the local storage 116 to the cloud source storage 126.

FIG. 2A is an example of a translational map 201 representing translational map 114 stored in backup server 106 (See FIG. 1) according to one embodiment. In one embodiment, for example, the translational map 201 may contain cloud data object identifications (IDs) or names and their mapping to the local object IDs or names from which they are generated. For non-dedupe backup applications, the local object IDs can also correspond to the files themselves (e.g., file path, inode numbers, etc.). In another embodiment, translational map 201 may also contain the list of meta object IDs. In this embodiment, translational map 201 may or may not have local object ID mappings depending on how the application deals with the meta object IDs. As further illustrated, translational map 201 represents translational map for dedupe applications. As shown, Cloud Object ID 202 is mapped to Local Object IDs 203 from which it is generated. One example of the translational map mapping the Cloud Object ID 202 to Local Object IDs 203 is shown below:

0x12345a=>0x00001, 0x00002
0x12345b=>0x00006, 0x00007, 0x000008
0xff11234=>0x000009
0x0000112=>No local mapping as its META object
0x0000114=>No local mapping as its META object FIG. 2B is an example of a translational map 204 for non-dedupe applications according to one embodiment. In one embodiment, Cloud Path 205 is mapped to Local Path 206 for non dedupe-applications. One example of the translational map mapping the Cloud Path 205 to Local Path 206 is shown below:

/backup/proj1/datadir1/file1=>/backup/ddmmyy_timeproj1datadirl/file1
/backup/proj1/datadir1/file2=>/backup/ddmmyy_timeproj1datadirl/file2

/backup/proj1/datadir1/file3=>/backup/ddmmyy_timeproj1datadirl/file3
/backup/proj1/meta_catalogue/page1=>/backup/ddmmyy_timeproj1catalogue/page1

In on embodiment, the above mapping to generate the translational maps 201, 204 may be based on how backup applications store the data locally and on the cloud tier. After the data are moved to the cloud, the translational map is created locally and redundancy analyzer 110 is triggered to start "redundancy analysis" process.

Figure 3:
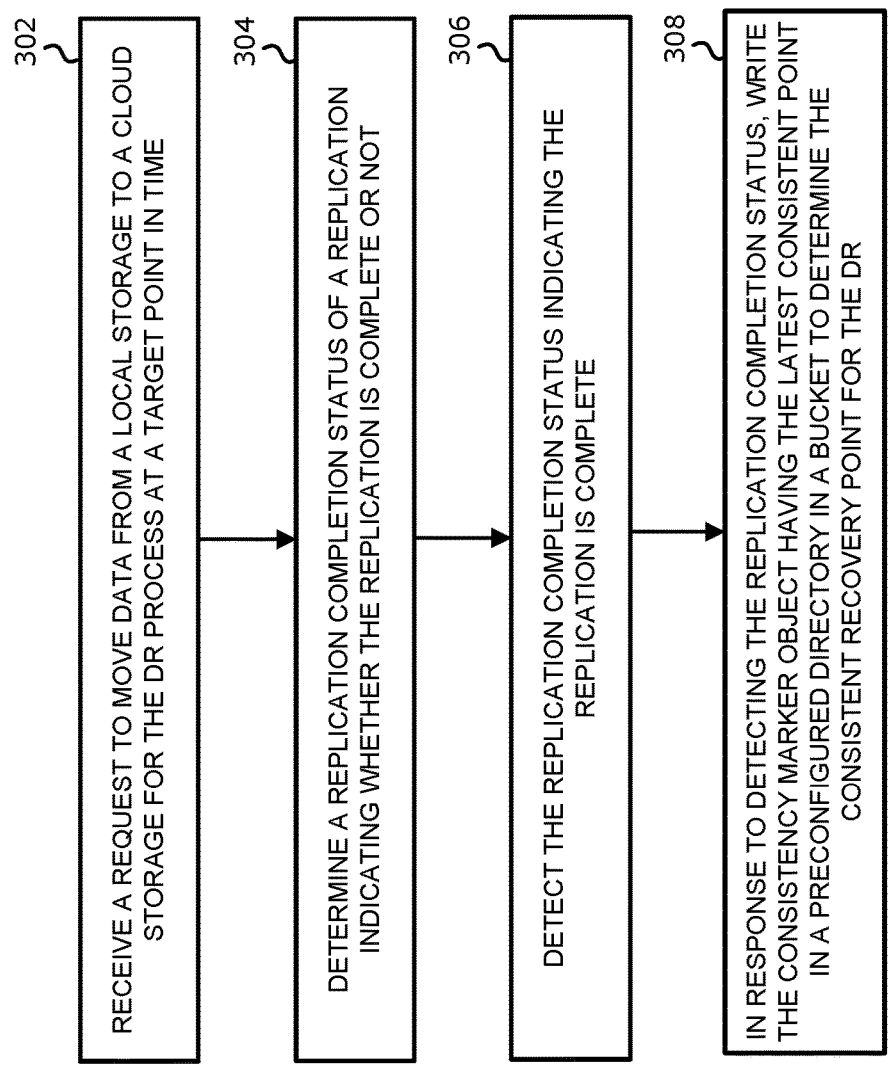
FIG. 3 is a flow diagram illustrating a method for determining consistency marker object according to one embodiment.

FIG. 2C is an example of a consistency marker object 208 according to one embodiment. The consistency marker object indicates that the corresponding consistent point can be used for recovery. In one embodiment, a consistency marker object may be written in the cloud. This consistency marker object may be written in a predetermined consistency directory, created to hold all such markers only. As shown in FIG. 2C, one example of the directories created to store such markers is shown below:
/d1/consistency/consistent_point_X_success
/d1/consistency/consistent_point_X-1_success
/d1/consistency/consistent_point_X-2_success FIG. 3 is a flow diagram illustrating method 300 for determining a consistency marker object representing the latest consistent recovery point for a disaster recovery (DR) process according to one embodiment. For example, method 300 can be performed by redundancy analyzer 110, which can be implemented in software, firmware, hardware, or any combination thereof. Method 300 will now be discussed with reference to FIGS. 1, 2A-2C.

Referring now to FIG. 3, at block 302, backup server 106 receives a request to move data from a local storage to a cloud storage for the DR process at a target point in time. In one embodiment, backup server 106 may decide based on preconfigured policies, to perform a data movement process for a set of files stored in the local storage 116 to a cloud source storage 126 in a cloud provider 120. The set of files may represent data 104 backed up at an earlier point in time from client 102. After receiving the request, backup server 106 may write new data objects (e.g., data and metadata) to the cloud source storage 126 on the cloud tier. The translation map 114 may be created in the backup server 106 once the data movement process is complete.

At block 304, redundancy analyzer 110 determines a replication completion status of a replication process indicating whether the replication is complete or not. In one embodiment, a cloud query is performed to determine the replication completion status of the new cloud objects (e.g., both data and meta object IDs from the translational map) written in the data movement process. In some embodiments, for example, the determination of the replication completion status of a replication process may be performed using methods such as loop querying the objects for their associated REPL state or checking the remaining total REPL bytes, either directly through cloud APIs or via lambda functions, etc.

At block 306, redundancy analyzer 110 detects the replication completion status indicating the replication process is complete. In this manner, a consistency marker is only written after verifying the replication is complete. Therefore, DR can only be performed from a completed set of replicated data and not from incomplete or ongoing sets of replicated data. This method provides an instant DR process by removing the lengthy process of analyzing and determining the presence of a consistent point to recover from during the DR process.

At block 308, in response to detecting the replication completion status, redundancy analyzer 110 writes the consistency marker object 208 having the latest consistent point information in a preconfigured directory in a cloud bucket to determine the consistent recovery point for a future DR process. Now referring to FIG. 2C, redundancy analyzer 110 writes the consistency marker object 208 (e.g., consistent_point_X_success) having the latest consistent point information in a preconfigured directory (e.g., d1/consistency/) in a cloud bucket. With the consistency marker object 208, the time taken for the disaster recovery process from a replicated data set is reduced as the method removes the need for the lengthy process to scan all meta and data to locate a valid consistent point from which the DR process can be done immediately.

Additionally, at a later point in time, when the DR process is executed, the backup server 106 initially determines the presence or absence of the consistency marker object 208 having the latest consistent recovery point. Thereafter, backup server 106 performs the DR process immediately from the latest consistent point by selecting the consistency marker object as the consistent recovery point. In this manner, backup server 106 can start the DR process by just validating the presence of the consistency marker. The backup server 106 can report that the DR process cannot be performed when the consistency marker is not detected. That means, the decisions related to the DR process can be performed instantly.

Further, redundancy analyzer 110 determines whether a data movement process is complete and local objects including data and metadata are written to the cloud bucket. Thereafter, redundancy analyzer 110 stores the local objects written to the cloud storage as cloud data objects, in a translational map (e.g., 201 and 204) mapping the cloud data objects and corresponding local objects.

In some embodiments, the determining of the replication completion status includes performing a query for the replication completion status of each of the cloud data objects in the translational map. The determining the status of a replication process includes pausing the query for the replication completion status for a predetermined amount of time if the replication completion status of one or more objects indicate that the replication process is not yet complete. For example, the query can run every 30 minutes, every 1 hour, or similar times. Therefore, once the query is performed, the query may fetch the result and if the query finds that one or more objects replication are not yet complete, then the query may be paused and restarted after the predetermined amount of time (e.g., 30 minutes or 1 hour) and may continue repeating this sequence until all objects are successfully replicated or one or more objects report that the replication has failed.

Determining the status of a replication includes removing each of the object from the translational map if the replication status of each object indicates the replication is complete.

In one embodiment, the query is stopped when the replication status of all objects is complete or the replication status of one or more of the cloud data objects indicates that replication process associated with the cloud data objects has failed. In another embodiment, the query for the replication completion status is performed using an object reporting API of the cloud provider. The replication completion status may be available via a GET object header or a HEAD request for the cloud data objects. In another embodiment, the query is performed using a lambda function in the cloud provider.

In some embodiments, for the cloud data objects for which replication process has failed, the backup server 106 executes steps to retrigger the replication of the cloud data objects via the cloud provider 120. In some embodiments, the backup server 106 may utilize any of the methods supported by the cloud provider 120 to trigger a replication for the objects. These methods may include, but not be limited to, rewriting, by the backup server 106, the same objects in the source cloud storage, in the same path, to retrigger the replication process or via cloud provider's event handling mechanism to retrigger replication process when the replication failure event is detected for any object.

Figure 4:
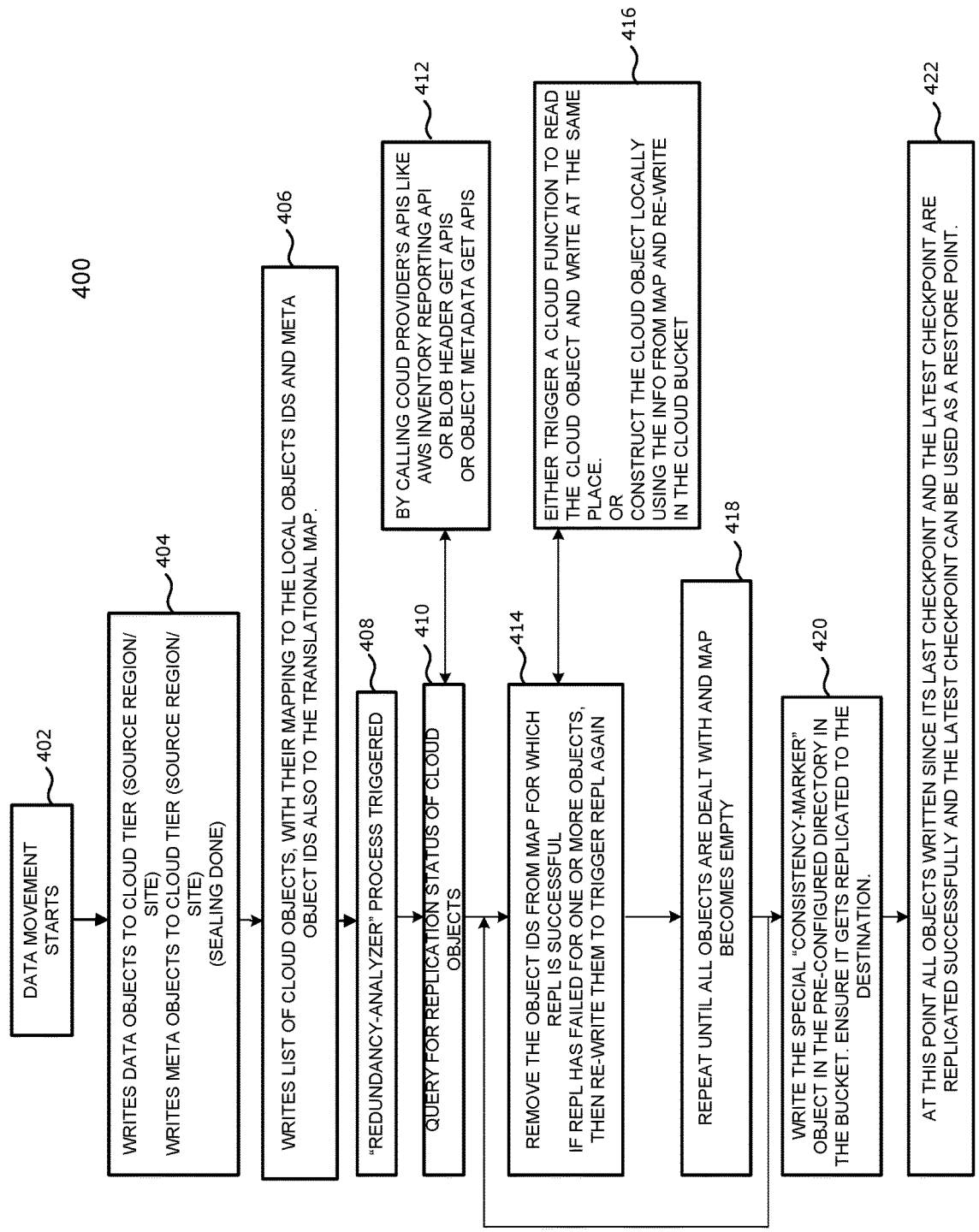
FIG. 4 is a flow diagram illustrating a method for generating a consistency marker object after all objects are successfully replicated according to one embodiment.

FIG. 4 is a flow diagram illustrating method 400 for generating a consistency marker object after all objects are successfully replicated according to one embodiment. Method 400 will now be discussed with reference to FIGS. 1 and 2A-2C.

At block 402, when backup server 106 starts data movement process for a set of files, it writes new data objects stored on the local storage 116 to the cloud source storage 126 as data object 128.

At block 404, once all the new data objects are written to the cloud source storage 126, backup server 106 then writes the metadata objects or files to the cloud tier (e.g., in case of DD it is called Sealing). In some embodiments, the metadata objects or files may be one large-sized object (e.g., 1 Gigabyte (GB). In one embodiment, the metadata can comprise a plurality of objects having a predefined size (e.g., 4 Megabyte (MB) each). In another embodiment, the metadata can be a single file (e.g., 1 GB). It should be appreciated that 4 MB and 1 GB are just an example.

Traditionally, the presence of the metadata objects may generally indicate the presence of a consistent point in the cloud tier. In a typical DR process from a cloud, the mere presence of a consistent point is sufficient for recovery. However, in a cloud provider replication, the presence of a consistency point may not guarantee that all objects written prior to the consistency point are replicated, hence this consistency point may no longer be treated as a consistency point from a recovery perspective.

At block 406, the backup server 106 may store the list of objects written to the cloud in a translational map (see FIGS. 2A-2B) once the data movement process is completed and objects (data and metadata) are successfully written to the source cloud storage.

At block 408, "redundancy-analyzer" process may be triggered. In this process, at block 410, redundancy analyzer 110 performs a cloud query for the replication status of the above objects (both data and meta object ids from the map) written in the data movement process. In one embodiment, redundancy analyzer 110 may pause re-query after a configurable amount of time if the replication status indicates the replication is not yet complete.

In some embodiments, at block 412, redundancy analyzer 110 may query for the replication status of the objects in the translational map using the cloud provider's object reporting APIs. For example, AWS provides Inventory Report API to obtain a list of objects and their associated replication statuses. In another example, Azure provides the replication status via the GET blob properties. In yet another example, for the EMC ECS private cloud, the replication status is available via the GET object headers or also via HEAD requests for the objects.

In one embodiment, a cloud function or a lambda function can be configured to perform this query in the cloud itself and return the report. This cloud function may be triggered by the "redundancy-analyzer" process via the configured REST endpoint for the lambda function. This method of querying may be applicable for public cloud providers and may reduce overall latency for the requests. On the other hand, the query can also be done directly by the "redundancy-analyzer" process. This method of querying may be more suited for private cloud providers where cloud functions or similar capabilities are not available.

At block 414, for each object whose replication status is confirmed to be successful, redundancy analyzer 110 removes that object's entry from the translational map 201, 204. Subsequent queries may be performed for the remaining objects in the translational map 201, 204.

If the redundancy analyzer 110 detects that replication has failed for one or more objects, then at block 416, redundancy analyzer 110 may re-trigger the replication for those affected objects via means supported by the cloud provider (e.g., cloud provider 120). For example, AWS may require the source object to be re-uploaded or re-written to trigger a replication. The source object can be re-uploaded or re-written via a cloud or lambda function in which the object is read and written back in the cloud itself. The "redundancy-analyzer" process can trigger the cloud function for all such objects. Additionally, some cloud providers support event mechanism for replication failures. For example, AWS supports the event "Replication time failed" when the replication for an object fails due to any reason. This method proposes that the described above cloud or lambda function can also be configured as a trigger for such events. This cloud function is responsible for re-triggering the replication i.e. it reads and re-writes the same object. In this manner any external re-triggering may be avoided. In another example, the object can be re-constructed from the local tier (on-prem) data and re-written in the same path on the cloud tier. Note that the local data needs to be protected from processes like reclamations (will be discussed in detail below) until this process is complete.

At block 418, redundancy analyzer 110 then repeats the loop querying for the remaining objects in the translational map until all objects have been removed from the translational map. Redundancy analyzer 110 may stop the querying when either all objects are successfully replicated or replication is unsuccessful for some objects. Other methods can also be utilized for this querying step to determine if the replication has completed or not. In one embodiment, backup server 106 may query the destination buckets for presence of the replicated objects instead of querying the replication state in the source buckets. In another embodiment, backup server 106 may use a direct API provided by the cloud provider to give the bytes remaining in the replication process—and if that becomes 0, it can be deemed that replication is complete. Backup server 106 can implement this per its convenience and feasibility.

Once the "redundancy-analyzer" process determines that all objects have been replicated successfully and the translational map is now empty, it is determined that all objects written since its last checkpoint and the latest checkpoint have been replicated successfully. The latest checkpoint can be used as a restore point in future disaster recovery scenarios.

At block 420, the process writes a consistency marker object in the cloud. The existence of this marker object indicates that the corresponding consistent point can be used for recovery. This consistency marker object may be written in a predetermined consistency directory, created to hold all such markers only. One example of the directories created to store such markers is shown below:

/d1/consistency/consistent_point_X_success
/d1/consistency/consistent_point_X-1_success
/d1/consistency/consistentpoint_X-2_success In one embodiment, for example, the consistency marker object can be an empty object. In another embodiment, the consistency marker object can contain information required to recover data from the destination (e.g., Metadata access details, paths, etc.).

In one embodiment, the consistency marker object may be written using a PUT request. The method 300 ensures the consistency marker object is successfully replicated to the destination. If any failure is determined during replication of this consistency marker object, the current consistency marker object is removed and re-written to re-trigger the replication for this marker object. This process may be repeated for a predetermined number of times until the consistency marker object is successfully replicated to the destination. In this manner, during the disaster recovery process, the backup server can check for the presence of or the latest consistency marker object and then select the latest consistency marker object as a point to recover from the destination. In addition, the backup server does not need to perform the lengthy process of validating metadata and data to determine if a consistent point is valid or not in the destination.

At block 422, the redundancy analyzer 110 determines all objects have been replicated up to the consistent point and the consistency marker object is successfully written and replicated. At this point, the data is protected against region failure or site disasters.

In case of a replication failure due to any reasons such as region unavailability, bucket issues etc., the cloud object may need to be rebuilt and rewritten. The local objects (files) from which the cloud object is constructed may need to be protected from a reclamation process like GC until the replication is verified to have completed successfully for all the cloud objects.

Figure 5:
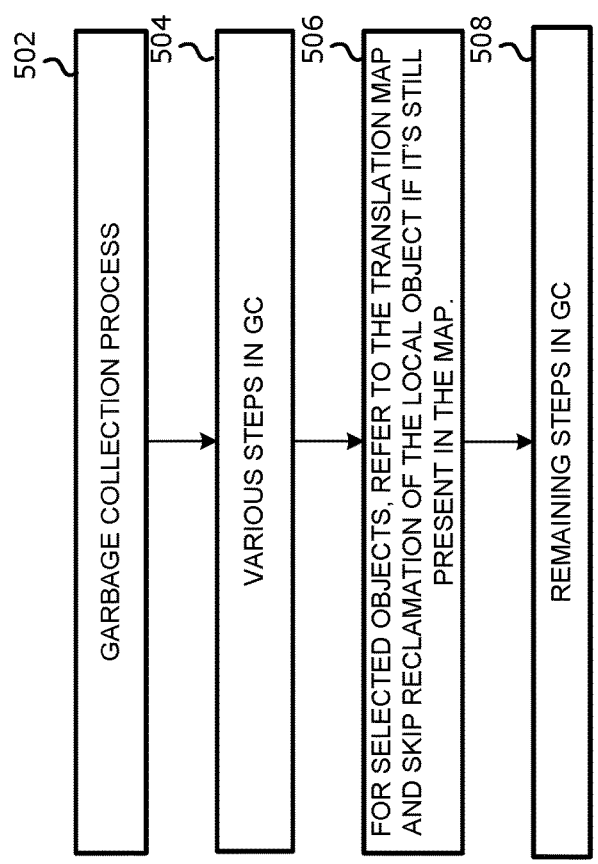
FIG. 5 is a flow diagram illustrating a method for enhanced Garbage Collector (GC) to protect local data until replication has completed according to one embodiment.

FIG. 5 depicts an example of an enhancement process 500 for Garbage Collector (GC) to protect local data until replication process is complete. In one embodiment, for example, at block 502, a GC process is initiated to manage the allocation and release of memory for an application. At block 504, various steps in the GC, such as a marking phase and a relocating phase, are performed. At block 506, the GC process may refer to the translational map created during the data movement process. In this manner, the GC process 500 may skip all the local object IDs currently listed in the translational map and the local objects can be protected from the GC processes. At block 508, remaining steps in the GC process, for the other objects that are not in the translational map, are performed. In general, the objects in the local tier are already protected from GC reclamations until the cloud objects are successfully written to the cloud tier. This enhancement process 500 additionally protects the objects in the local tier even further until the corresponding cloud objects are successfully replicated to the destination region or site.

Figure 6:
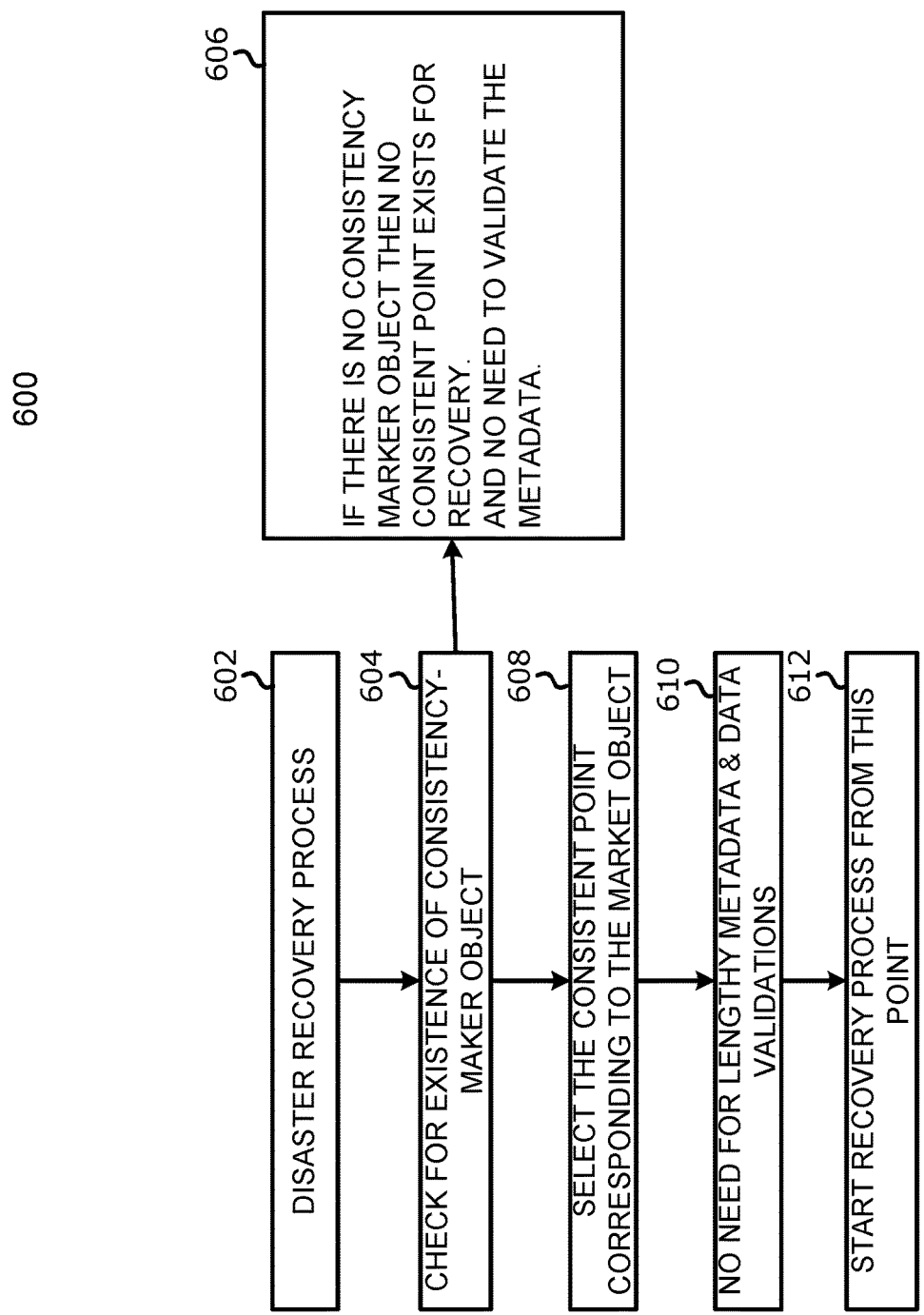
FIG. 6 is a flow diagram illustrating a method for a disaster recovery (DR) process based on a consistency marker object according to one embodiment.

FIG. 6 illustrates an example of a DR process 600 based on a consistency marker object. Method 600 will now be discussed with reference to FIGS. 1, 2A-2C. When a disaster happens at source region or site, at block 602, backup server 106 starts a DR process. At block 604, backup server 106 determines the presence of the latest consistency marker object in the destination. Backup server 106 may read the consistency marker object (if any meta information was written to it). At block 606, if no consistency marker objects are present, it is indicated that the replication is not yet complete fully. This means it is not possible to recover consistent data from the destination. In this case, there is also no need to perform the lengthy data and metadata validations as they are anyways going to fail.

At block 608, backup server 106 selects that point as recovery point. At block 610, the lengthy process of validating data and metadata can be avoided as the consistency is guaranteed by the presence of the marker object. At block 612, backup server 106 initiates the DR process by starting recovery process of the selected consistent point at block 608.

Figure 7:
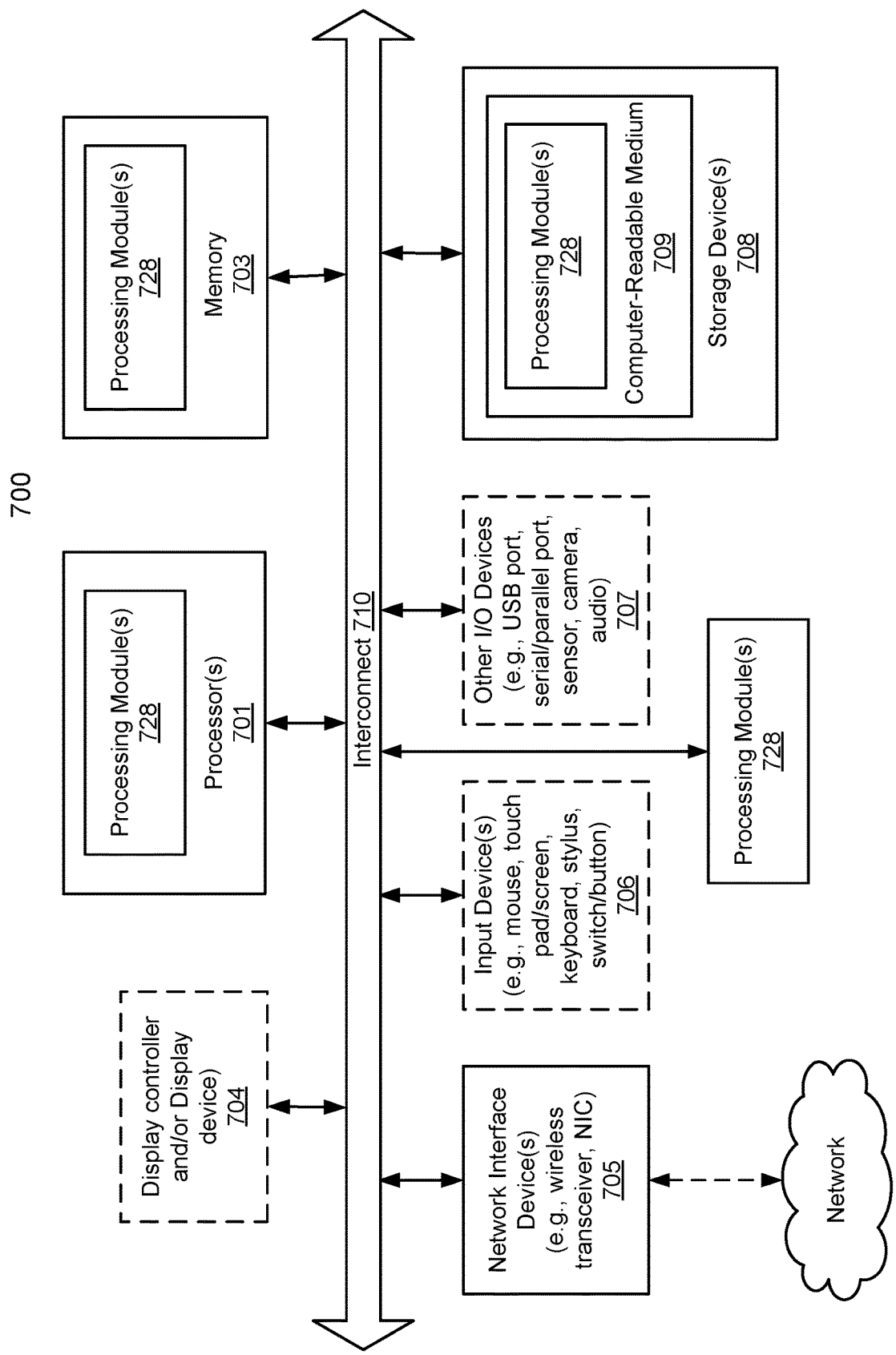
FIG. 7 is a block diagram illustrating a data processing system according to one embodiment.

Various embodiments and FIG. 7 is a block diagram illustrating an example of a data processing system which may be used with one embodiment of the invention. For example, system 700 may represent any of data processing systems described above performing any of the processes or methods described above. System 700 can include many different components.

These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 700 is intended to show a high level view of many components of the computer system. However, it is to be understood that additional components may be present in certain implementations and furthermore, different arrangement of the components shown may occur in other implementations. System 700 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 700 includes processor 701, memory 703, and devices 705-708 via a bus or an interconnect 710. Processor 701 may represent a single processor or multiple processors with a single processor core or multiple processor cores included therein. Processor 701 may represent one or more general-purpose processors such as a microprocessor, a central processing unit (CPU), or the like. More particularly, processor 701 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 701 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 701, which may be a low power multi-core processor socket such as an ultra-low voltage processor, may act as a main processing unit and central hub for communication with the various components of the system. Such processor can be implemented as a system on chip (SoC). Processor 701 is configured to execute instructions for performing the operations and steps discussed herein. System 700 may further include a graphics interface that communicates with optional graphics subsystem 704, which may include a display controller, a graphics processor, and/or a display device.

Processor 701 may communicate with memory 703, which in one embodiment can be implemented via multiple memory devices to provide for a given amount of system memory. Memory 703 may include one or more volatile storage (or memory) devices such as random access memory (RAM), dynamic RAM (DRAM), synchronous DRAM (SDRAM), static RAM (SRAM), or other types of storage devices. Memory 703 may store information including sequences of instructions that are executed by processor 701, or any other device. For example, executable code and/or data of a variety of operating systems, device drivers, firmware (e.g., input output basic system or BIOS), and/or applications can be loaded in memory 703 and executed by processor 701. An operating system can be any kind of operating systems, such as, for example, Windows® operating system from Microsoft Mac OS®/iOS from Apple, Android® from Google Linux®, Unix®, or other real-time or embedded operating systems such as VxWorks.

System 700 may further include IO devices such as devices 705-708, including network interface device(s) 705, optional input device(s) 706, and other optional IO device(s) 707. Network interface device 705 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 706 may include a mouse, a touch pad, a touch sensitive screen (which may be integrated with display device 704), a pointer device such as a stylus, and/or a keyboard (e.g., physical keyboard or a virtual keyboard displayed as part of a touch sensitive screen). For example, input device 706 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 707 may include an audio device. An audio device may include a speaker and/or a microphone to facilitate voice-enabled functions, such as voice recognition, voice replication, digital recording, and/or telephony functions. Other IO devices 707 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 707 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 710 via a sensor hub (not shown), while other devices such as a keyboard or thermal sensor may be controlled by an embedded controller (not shown), dependent upon the specific configuration or design of system 700.

To provide for persistent storage of information such as data, applications, one or more operating systems and so forth, a mass storage (not shown) may also couple to processor 701. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 701, e.g., via a serial peripheral interface (SPI). This flash device may provide for non-volatile storage of system software, including a basic input/output software (BIOS) as well as other firmware of the system.

Storage device 708 may include computer-accessible storage medium 709 (also known as a machine-readable storage medium or a computer-readable medium) on which is stored one or more sets of instructions or software (e.g., processing module, unit, and/or logic 709) embodying any one or more of the methodologies or functions described herein. Processing module/unit/logic 709 may represent any of the components described above, such as, for example, backup server 106, backup application 108, redundancy analyzer 110, backup logic 121, restore logic 123, garbage collector 112, cloud computing service 122, or API 124 as described above. Processing module/unit/logic 709 may also reside, completely or at least partially, within memory 703 and/or within processor 701 during execution thereof by data processing system 700, memory 703 and processor 701 also constituting machine-accessible storage media. Processing module/unit/logic 709 may further be transmitted or received over a network via network interface device 705.

Computer-readable storage medium 709 may also be used to store some of the software functionalities described above persistently. While computer-readable storage medium 709 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 709, components and other features described herein can be implemented as discrete hardware components or integrated in the functionality of hardware components such as ASICS, FPGAs, DSPs or similar devices. In addition, processing module/unit/logic 709 can be implemented as firmware or functional circuitry within hardware devices. Further, processing module/unit/logic 709 can be implemented in any combination hardware devices and software components.

Note that while system 700 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods described above are in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method of determining a consistency marker object representing a latest consistent recovery point for a disaster recovery (DR) process, the method comprising:

receiving a request to move data from a local storage to a cloud storage for the DR process at a target point in time;

determining a replication completion status of a replication process indicating whether the replication process is complete;

detecting the replication completion status indicating the replication process is complete;

in response to detecting the replication completion status, writing the consistency marker object having the latest consistent recovery point in a preconfigured directory in a cloud bucket for determining a consistent recovery point for a future DR process; and determining whether a data movement process is complete and local objects including data and metadata are written to the cloud bucket.

2. The method of claim 1, further comprising:
performing the DR process immediately from the latest consistent recovery point by selecting the consistency marker object as the consistent recovery point.

3. The method of claim 1, further comprising: storing the local objects written in the cloud storage as cloud data objects in a translational map mapping the cloud data objects and corresponding local objects.

4. The method of claim 3, wherein the determining of the replication completion status comprises:
performing a query for the replication completion status of each of the cloud data objects in the translational map;
pausing the query for the replication completion status for a predetermined amount of time if the replication completion status of one or more objects indicate that the replication process is not yet complete; and
removing each of the cloud data objects from the translational map if a replication status of each of the cloud data objects indicates the replication process is complete.

5. The method of claim 4, wherein the query for the replication completion status is stopped when the replication status of all cloud data objects is complete or the replication status of one or more of the cloud data objects indicates that replication process associated with the cloud data objects has failed.

6. The method of claim 5, wherein the query for the replication completion status is performed using an object reporting API of a cloud provider, the replication completion status being available via a GET object header or a HEAD request for the cloud data objects.

7. The method of claim 5, wherein the query is performed using a lambda function in a cloud provider.

8. The method of claim 4, further comprising:
performing, by a cloud provider, the replication process for the cloud data objects if the replication process has failed, wherein the performing of the replication process for the cloud data objects includes:
rewriting the cloud data objects associated with the failed replication process in a same path of the cloud storage to retrigger the replication process.

9. A non-transitory machine-readable medium having instructions stored therein, which when executed by a processor, cause the processor to perform operations of determining a consistency marker object representing a latest consistent recovery point for a disaster recovery (DR) process, the operations comprising:

receiving a request to move data from a local storage to a cloud storage for the DR process at a target point in time;

determining a replication completion status of a replication process indicating whether the replication process is complete or not;

detecting the replication completion status indicating the replication process is complete;

in response to detecting the replication completion status, writing the consistency marker object having the latest consistent recovery point in a preconfigured directory in a cloud bucket to determine a consistent recovery point for a future DR process; and determining whether a data movement process is complete and local objects including data and metadata are written to the cloud bucket.

10. The machine-readable medium of claim 9, wherein the operations comprising further comprises:

performing the DR process immediately from the latest consistent recovery point by selecting the consistency marker object as the consistent recovery point.

11. The machine-readable medium of claim 9, wherein the operations comprising further comprises: storing the local objects written in the cloud storage as cloud data objects in a translational map mapping the cloud data objects and corresponding local objects.

12. The machine-readable medium of claim 11, wherein the determining of the replication completion status comprises:

performing a query for the replication completion status of each of the cloud data objects in the translational map;

pausing the query for the replication completion status for a predetermined amount of time if the replication completion status of one or more objects indicate that the replication process is not yet complete; and removing each of the cloud data objects from the translational map if a replication status of each of the cloud data objects indicates the replication process is complete.

13. The machine-readable medium of claim 12, wherein the query for the replication completion status is stopped when the replication status of all cloud data objects is complete or the replication status of one or more of the cloud data objects indicates that replication process associated with the cloud data objects has failed.

14. The machine-readable medium of claim 13, wherein the query for the replication completion status is performed using an object reporting API of a cloud provider, the replication completion status being available via a GET object header or a HEAD request for the cloud data objects.

15. A data processing system, comprising:
a processor; and
a memory to store instructions, which when executed by the processor, cause the processor to perform operations of determining a consistency marker object representing a latest consistent recovery point for a disaster recovery (DR) process, the operations including:

receiving a request to move data from a local storage to a cloud storage for the DR process at a target point in time;

determining a replication completion status of a replication process indicating whether the replication process is complete or not;

detecting the replication completion status indicating the replication process is complete;

in response to detecting the replication completion status, writing the consistency marker object having the latest consistent recovery point in a preconfigured directory in a cloud bucket to determine a consistent recovery point for a future DR process; and determining whether a data movement process is complete and local objects including data and metadata are written to the cloud bucket.

16. The data processing system of claim 15, wherein the operations comprising further comprises:

performing the DR process immediately from the latest consistent recovery point by selecting the consistency marker object as the consistent recovery point.

17. The data processing system of claim 15, wherein the operations comprising further comprises:

storing the local objects written in the cloud storage as cloud data objects in a translational map mapping the cloud data objects and corresponding local objects.

18. The data processing system of claim 17, wherein the determining of the replication completion status comprises:

performing a query for the replication completion status of each of the cloud data objects in the translational map;

pausing the query for the replication completion status for a predetermined amount of time if the replication completion status of one or more objects indicate that the replication process is not yet complete; and removing each of the cloud data objects from the translational map if a replication status of each of the cloud data objects indicates the replication process is complete.

19. The data processing system of claim 18, wherein the query for the replication completion status is stopped when the replication status of all cloud data objects is complete or the replication status of one or more of the cloud data objects indicates that replication process associated with the cloud data objects has failed.

20. The data processing system of claim 19, wherein the query for the replication completion status is performed using an object reporting API of a cloud provider, the replication completion status being available via a GET object header or a HEAD request for the cloud data objects.

* * * * *